United States Patent
Yuan et al.

(10) Patent No.: US 7,087,672 B2
(45) Date of Patent: Aug. 8, 2006

(54) NON-YELLOWING POLYESTER COATING COMPOSITION

(75) Inventors: San C. Yuan, Commerce Township, MI (US); Mitchell S. Chinn, Troy, MI (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/140,737

(22) Filed: May 8, 2002

(65) Prior Publication Data

US 2003/0212192 A1 Nov. 13, 2003

(51) Int. Cl.
*C08G 18/06* (2006.01)

(52) U.S. Cl. ............... 524/507; 524/502; 524/513; 524/522; 524/584; 524/539; 427/388.4

(58) Field of Classification Search ............... 524/502, 524/507, 513, 522, 584, 539; 427/388.4
See application file for complete search history.

(56) References Cited

U.S. PATENT DOCUMENTS

| | | | |
|---|---|---|---|
| 2,966,472 A | | 12/1960 | Fiel |
| 3,222,322 A | | 12/1965 | Nischk et al. |
| 3,580,873 A | | 5/1971 | Bianca |
| 3,960,789 A | | 6/1976 | Daimer et al. |
| 4,132,687 A | | 1/1979 | Behmel et al. |
| 4,147,674 A | | 4/1979 | Vasta |
| 4,150,007 A | * | 4/1979 | McCollum .............. 523/402 |
| 4,591,533 A | | 5/1986 | Antonelli et al. |
| 4,666,984 A | | 5/1987 | Carlick et al. |
| 4,812,523 A | * | 3/1989 | Toman .................. 525/162 |
| 5,294,650 A | | 3/1994 | Sharma |
| 5,502,101 A | * | 3/1996 | Schwarte et al. ........ 524/460 |
| 5,508,340 A | | 4/1996 | Hart |
| 5,563,206 A | | 10/1996 | Eicken et al. |
| 5,576,397 A | * | 11/1996 | Oberressl et al. ........ 525/444 |
| 5,665,269 A | | 9/1997 | Hart |
| 5,786,033 A | * | 7/1998 | Gast et al. ............. 427/412.1 |
| 6,180,180 B1 | | 1/2001 | Hintze-Bruning et al. |
| 6,277,953 B1 | | 8/2001 | Nothnagel et al. |
| 6,306,956 B1 | | 10/2001 | Spilman et al. |
| 6,309,707 B1 | * | 10/2001 | Mayer et al. ............ 427/386 |
| 6,649,734 B1 | * | 11/2003 | Campbell et al. ........ 528/422 |
| 2002/0010260 A1 | * | 1/2002 | Faler et al. ............. 524/804 |
| 2002/0028874 A1 | | 3/2002 | Nothnagel et al. |
| 2002/0147269 A1 | | 10/2002 | Spilman et al. |

FOREIGN PATENT DOCUMENTS

| | | |
|---|---|---|
| DE | 4123080 A1 | 1/1993 |
| DE | 19849394 A1 | 6/1998 |
| DE | 19837601 A1 | 8/1999 |
| DE | 19932497 A1 | 1/2001 |
| DE | 19945574 A1 | 4/2001 |
| EP | 0206615 A2 | 12/1986 |
| EP | 601378 A1 | 6/1994 |
| EP | 0812867 A1 | 12/1997 |
| EP | 1028149 A2 | 8/2000 |
| WO | WO 200121720 A1 * | 3/2001 |

OTHER PUBLICATIONS

Copy of International Search Report (PCT/US03/14220) dated May 5, 2003.

* cited by examiner

*Primary Examiner*—Ling-Sui Choi
*Assistant Examiner*—Satya B Sastri
(74) *Attorney, Agent, or Firm*—Steven C. Benjamin

(57) ABSTRACT

A non-yellowing coating composition particularly useful as primer that has a low VOC and excellent adhesion and chip resistance and comprises an aqueous coating composition having a VOC of less than 0.12 kg/L (1.0 pounds/gallon) comprising 25–70% by weight of a film forming binder and correspondingly, 75–30% by weight of an aqueous carrier for the binder and the composition contains pigment in a pigment to binder weight ratio of 5/100 to 150/100 and has a pH of 7–10; wherein the binder comprises a. 50–90% by weight, based on the weight of the binder, of a blend of the following constituents: a dispersed acrylic polymer, a dispersed polyester having an acid value of 15–60, a number average molecular weight from 1500–7000 and a hydroxyl value of not more than 95 and a hydroxy terminated component that is either a polyalkylene ether polyol or a urethane diol or a mixture of the above hydroxy terminated components, and b. 10–50% by weight, based on the weight of the binder, of a water-compatible alkylated melamine formaldehyde crosslinking agent; and wherein a hydroxy functional alkyl amine is used to neutralize the binder and adjust the pH of the composition.

15 Claims, No Drawings

NON-YELLOWING POLYESTER COATING COMPOSITION

BACKGROUND OF THE INVENTION

1. Field of the Invention

This invention is directed to coating compositions, in particular, to aqueous non-yellowing polyester primer compositions.

2. Description of the Prior Art

The finishing system of choice presently being used on the exterior of automobiles and trucks comprises a clear coating applied over a pigmented base coating that is applied over a primer coating. Primer coatings that are in current use provide excellent properties, such as, stone chip resistance and good adhesion to the base coat (situated above the primer layer) as well as the substrate below the primer layer. The substrate most typically encountered is steel that has been electrocoated with an epoxy modified resin crosslinked with a polyisocyanate. Plastic substrates are also used with the plastic surface usually modified in some manner (i.e., with an adhesion promoter or flame or plasma treated) to promote adhesion.

Typical primers in current use are polyesters and polyester urethanes that are crosslinked with a melamine resin or a polyisocyanate. While these primers provide the desired level of adhesion and chip resistance, they often yellow after baking at elevated temperatures or on aging or on exposure to UV light which may penetrate through the clear and base coats depending on the amount of pigmentation used in these coats. Obviously, yellowing of the primer layer changes the overall color of the finish, particularly, when light colors, such as, whites, light grays, tans are used. Even dark colors can be adversely affected, such as, blues and greens. Also, to achieve water dispersibility of the polyester and polyester urethane used in these primers, relatively high levels of organic solvents are used resulting in the primers having a VOC (volatile organic content) in the range of 2.0–4.0 pounds/gallon (0.24–0.48 kg/L) and higher. Current air pollution standards require coating composition to have a VOC content below 2.0 pounds/gallon (0.24 kg/L).

The novel primer composition of this invention is composed of a binder of a blend of a particular polyester, dispersed acrylic polymer, various polyols and a melamine crosslinking agent. The dispersed components are neutralized and the pH of the primer composition is adjusted with a hydroxy functional alkyl amine. The resulting primer composition has excellent adhesion to both topcoats and substrates, has good chip resistance, a VOC of less than 1.0 pounds/gallon (0.12 kg/L) and does not show significant yellowing after being baked at high temperatures or on aging.

SUMMARY OF THE INVENTION

An aqueous coating composition having a VOC of less than 0.12 kg/L (1.0 pounds/gallon) comprising 25–70% by weight of a film forming binder and correspondingly, 75–30% by weight of an aqueous carrier for the binder and containing pigment in a pigment to binder weight ratio of 5/100 to 150/100 and having a pH of 7–10; wherein the binder comprises a. 50–90% by weight, based on the weight of the binder, of a blend of the following constituents: a dispersed acrylic polymer, a dispersed polyester having an acid value of 15–60, a number average molecular weight from 1500–7000 and a hydroxyl value of not more than 95 and a hydroxy terminated component that is either a polyalkylene ether polyol or a urethane diol or a mixture of the above hydroxy terminated components, and b. 10–50% by weight, based on the weight of the binder, of a water-compatible alkylated melamine formaldehyde crosslinking agent; and wherein a hydroxy functional alkyl amine is used to neutralize the binder and adjust the pH of the composition.

DETAILED DESCRIPTION OF THE INVENTION

A typical auto or truck body is produced from a steel sheet, a plastic substrate or a composite substrate. If steel is used, it is first treated with an inorganic rust-proofing compound, such as zinc or iron phosphate and then a primer coating is applied generally by electrodeposition. Typically, these electrodeposition primers are epoxy-modified resins crosslinked with a polyisocyanate and are applied by a cathodic electrodeposition process. Generally, a primer (also described as a primer/surfacer) is applied over the electrodeposited primer, usually by spraying, to provide better appearance and/or improved adhesion of a base coating or a mono coating to the primer. For plastic or composite substrates, a primer is applied over the substrate. A monocoating of a pigmented coating composition then can be applied over the primer but preferably, a pigmented base coating with a clear top coating is applied to form a finish on the truck or automobile body or auto or truck part. Usually, after application, each of the coatings is cured by baking at elevated temperatures. It is generally known that a clear top coating can be applied over the base coating and both coatings cured together at an elevated temperature.

The particular advantages of the novel primer composition of this invention are that it has a low VOC, i.e., a VOC less than 0.12 kg/L (1.0 pound per gallon) and meets current governmental air pollution regulations and the primer does not yellow after being baked at high temperatures or on aging. The primer has excellent adhesion to cathodically deposited primers and to various plastic and composite substrates and provides a layer to which a base coat or pigmented mono-coat will adhere. The use of hydroxy functional alkyl amines to neutralize the film forming polymers used in the primer and to adjust the pH of the primer allows for the formulation of low VOC compositions and compositions that are resistant to yellowing after baking at high temperatures and on aging.

The VOC of the coating composition is determined in accordance with the procedure of EPA Method 24.

Yellowing of a coated substrate can be measured with an X-Rite Colorimeter for delta b value of the coating and compared to the delta b value of a control panel.

The novel composition typically has a solids content of film forming binder of 25 to 70% by weight. Since the aqueous liquid carrier does not contribute to the VOC of the composition, sufficient amounts of the liquid may be added, for example, to reduce the composition to a spray viscosity or may be a portion of an additive solution, such as, a rheology control additive, without increasing the VOC of the composition.

The novel primer composition has a pH of 7.0 to 10.0 and preferably, 7.5 to 8.5. The binder of the primer composition is neutralized and the pH of the primer composition is adjusted by the addition of various hydroxy functional alkyl amines, such as those discussed hereinafter. Particularly preferred amines are AMP (2-amino-2-methyl-1-propanol) and MDEOA (N-methyldiethanolamine).

The film forming binder of the primer composition contains 50–90% by weight, based the weight of the binder, of a blend of polymers comprising a dispersed acrylic polymer; a hydroxyl terminated component; and a dispersed polyester and 10–50% by weight, based on the weight of the binder, of a water compatible alkylated melamine formaldehyde crosslinking agent. Preferably, the blend of polymers comprises about 30–90% by weight, based on the weight of the blend, of a polyester, 5–45% by weight, based on the weight of the blend, of an acrylic polymer and 5–35% by weight, based on the weight of the blend, of the hydroxyl terminated component.

The polyester used in the primer has an acid value of 15 to 60, a hydroxyl value of not more than 95 and has a number average molecular weight from 1500 to 7000. The polyester is the esterification product of one or more polyhydric alcohols, such as, alkylene diols and glycols; monocarboxylic acids and a polycarboxylic acids or anhydrides thereof, such as, dicarboxylic and/or tricarboxylic acids or tricarboxylic acid anhydrides.

Examples of useful polyhydric alcohols include triols and tetraols, such as, trimethylol propane, triethylol propane, trimethylol ethane, glycerine, pentaerythritol, tris (hydroxyethyl)isocyanurate and dihydric alcohols and diols that include ethylene glycol, propylene glycol, 1,4 butylene diol, 1,3 butylene diol, neopentyl glycol, diethylene glycol, dipropylene glycol, 1,6 hexane diol, 1,4-cyclohexane dimethanol, Esterdiol 204 (Trademark of Union Carbide) and 1,3 propane diol. Polyhydric alcohols having carboxyl groups may be used, such as dimethylol propionic acid (DMPA).

Typical polycarboxylic acids and anhydrides that can be used to form the polyester are aromatic carboxylic acids, such as isophthalic acid, terephthalic acid, phthalic acid, phthalic anhydride, dimethyl terephthalic acid, naphthalene dicarboxylic acid, tetrachlorophthalic acid, terephthalic acid bisglycol ester, benzophenone dicarboxylic acid, trimellitic acid and trimellitic anhydride.

Typical aliphatic carboxylic acids that can be used to form the polyester include adipic acid, azelaic acid and succinic acid.

One useful polyester is the estrification product of neopentyl glycol, trimethylol propane, 1,6 hexane diol, adipic acid, isophthalic acid and trimellitic anhydride.

The dispersed acrylic polymer can be a dispersion of an acrylic polymer having a weight average molecular weight of 5,000 to 150,000, for example, a polymer of an alkyl (meth)acrylate having 1–12 carbon atoms in the alkyl group, a hydroxy alkyl(meth)acrylate having 1–4 carbon atoms in the alkyl group and acrylic acid or methacrylic acid. An acrylic latex can also be used wherein the latex polymer has a weight average molecular weight of 1 million to 5 million. One preferred hydroxy functional acrylic latex comprises a core shell polymer of allyl methacrylate, methyl methacrylate, butyl acrylate, hydroxy ethyl acrylate and methacrylic acid. Other useful acrylic polymers are disclosed in EP Patent 206 615, which is hereby incorporated by reference.

The hydroxy terminated component used in the primer composition can be polyalkylene ether polyol or a urethane diol or a mixture of the above. The hydroxy terminated component acts as a reactive diluent and can provide nonionic stabilization to the primer composition.

Typically polyalkylene ether glycols that are used in the formation of the primer composition have a number average molecular weight of 100 to 2,000 and are used in an amount of 5 to 35% by weight, based on the weight of the binder. Typical examples are PPG-425, PPG-725, PPG-1025 that are polypropylene glycols and are preferred since they reduce water sensitivity of the resulting primer coating. Other useful glycols are, for example, poylethylene glycol, for example, "PEG"-600 and "PEG"-900, tripropylene glycol monomethyl ether, diethylene glycol monobutyl ether, and polybutylene glycol. Also, blends of polyalkylene ether glycols and hydroxy urethane diols can be used, such as, a blend of a polyalkylene ether glycol having a number average molecular weight of 300–1500 and a hydroxy functional urethane diol.

All molecular weights disclosed herein are determined by gel permeation chromatography (GPC).

The urethane diols that can be used are the reaction product of a diol, such as an aliphatic diol and an aliphatic diisocyanate or a reaction product of diamine with cyclo organic carbonate and have a hydroxyl number in the range of 50 to 500.

The primer composition contains about 10–50% by weight, based on the weight of the binder, of a water-compatible alkylated melamine crosslinking agent. Preferably, 10–35% by weight of an alkylated melamine crosslinking agent is used. Typical alkylated melamines that can be used are water-soluble or water-dispersible melamines that are monomeric or polymeric and have a relatively low molecular weight. Alkoxy monomeric melamines that can be used are low molecular weight melamines that contain on an average three or more methylol groups reacted with a monohydric alcohol having 1 to 5 carbon atoms, such as, methanol, propanol, n-butanol and isobutanol and have an average degree of polymerization of less than 2 and preferably, in the range of about 1.1 to 1.8.

Suitable monomeric melamines include highly alkylated melamines, such as, methylated melamines, methylated and butylated melamines, butylated melamines, isobutylated melamines and mixtures thereof. More particularly, hexamethoxymethylol melamine, butylated melamines and mixed methylated and butylated melamines are preferred. Particularly preferred alkylated melamines for the primer composition include hexamethoxymethylol melamines, such as, Cymel® 301 and 303 and Resimene® 747, Cymel® 1156 which is reported to be a 100% butylated melamine having a degree of polymerization of 2.9. A particularly preferred mixture of melamines is Cymel® 1156 and Resimene® CE-4514 which is reported to be a 50/50 methylated/butylated melamine.

A typically useful polymeric melamine is Cymel® 327 which is a highly methylated melamine having a degree of polymerization of 1.8. Other polymeric melamines, such as Cymel® 328 can also be used. These melamines are supplied commercially; for example, by Cytec Industries Inc., Stamford, Conn., and by Solutia Inc., Springfield, Mass.

Hydroxy functional alkyl amines are used to neutralize the various polymer constituents of the primer composition to form a water-soluble or water-dispersible product and to adjust the pH of the primer composition. The amine reacts with any pendant carboxyl groups of the polymer constituents to form a water soluble salt. Typical hydroxy functional alkyl amines that can be used include AMP (2-amino-2-methyl-1-propanol), amino ethyl propanol, N,N-dimethylethanolamine, N-methyl diethanolamine, diethanolamine, diglycolamine, tris(hydroxymethyl)- aminomethane, 2-amino-2-ethyl-1,3 propanediol, diisopropanolamine and triisopropanolamine. AMP and N-methyldiethanolamine are preferred amines. The pH of the coating composition is adjusted with these amines to the desired level. These hydroxy functional alkyl amines reduce yellowing of the primer composition when baked at elevated temperatures and upon aging and when exposed to outdoor weathering.

Surprisingly, certain of these amines, such as triisopropanolamine and N-methyldiethanolamine, not only provide reduced yellowing, but also significantly reduce the VOC of the primer composition. Significant reduction in VOC has also been realized from combinations of amines, such as triisopropanolamine and N-methyldiethanolamine or triisopropanolamine and diethanolamine where one amine is used for neutralization and the second is used to adjust the pH.

Curing catalysts, are generally used in the primer composition in amounts of 0.1% to 2.0% by weight, based on the weight of the binder, for catalyzing the crosslinking of the various polymer constituents with the alkylated melamine crosslinking agent. Preferred are blocked sulfonic acid catalysts. Typical blocked acid catalysts include blocked paratoluene sulfonic acid, blocked dodecyl benzene sulfonic acid, blocked dinonyl naphthalene disulfonic acid in which the blocking agent is an amine, such as, AMP, dimethyl oxazolidine or N-methyldiethanolamine. In the event the composition contains an excess of amine, the acid catalyst need not be blocked and the acid form of the catalyst can be added directly.

An alkyl or aryl acid phosphate catalyst, such as, butyl acid phosphate or phenyl acid phosphate can be used in addition to the above acid catalysts.

Other catalysts that can be used to improve the cure rate of the composition include dibutyl tin dilaurate, dibutyl tin diacetate, dibutyl tin dichloride, dibutyl tin dibromide, triphenyl boron, tetraisopropyl titanate, triethanolamine titanate chelate, dibutyl tin dioxide, dibutyl tin dioctoate, tin octoate, aluminum titanate, aluminum chelates, zirconium chelates, and other such catalysts or mixtures thereof know to those skilled in the art.

Typical pigments that are used in the primer composition are carbon black, barytes, silica, iron oxide and other pigments that are commonly used in primers in a pigment-to-binder ratio of 5/100 to 150/100. The pigments are formulated into mill bases by conventional procedures, such as, grinding, sand milling, and high speed mixing. Generally, the mill base comprises pigment and a dispersant in an aqueous medium. The mill base is added in an appropriate amount to the primer composition with mixing to form a pigmented primer composition.

Any of the conventionally-used organic and inorganic pigments, such as, white pigments, like, titanium dioxide, color pigments, metallic flakes, such as, aluminum flake, special effects pigments, such as, coated mica flakes, coated aluminum flakes and the like and extender pigments may also be used. Also, it may be desirable to add one of the following UV light stabilizers and flow control additives.

To improve the weatherability of the primer coating, which under some circumstance may be exposed to sunlight, an ultraviolet light stabilizer or a combination of ultraviolet light stabilizers can be added to the primer composition in the amount of 0.1% to 10% by weight, based on the weight of the binder. Such stabilizers include ultraviolet light absorbers, screeners, quenchers, and specified hindered amine light stabilizers. Also, an antioxidant can be added, in the amount 0.1% to 5% by weight, based on the weight of the binder.

Typical ultraviolet light stabilizers that are useful include benzophenones, triazoles, triazines, benzoates, hindered amines and mixtures thereof. Specific examples of ultraviolet stabilizers are disclosed in U.S. Pat. No. 4,591,533, the entire disclosure of which is incorporated herein by reference. For good durability, a blend of Tinuvin® 1130, 384 and 123 (hindered amine light stabilizers), all commercially available from Ciba Specialty Chemicals, Tarrytown, N.Y. is preferred.

The primer composition may also include other conventional formulation additives, such as, wetting agents, leveling and flow control agents, for example, Resiflow®S (polybutylacrylate), BYK® 320 and 325 (high molecular weight polyacrylates), BYK® 347 or Tegowet® 280 (polyether-modified siloxane), rheology control agents, such as, fumed silica, alkali swellable acrylic emulsion and synthetic swellable clay, defoamers, surfactants and emulsifiers to help stabilize the composition. Typically, the primer composition contains 0.1–5% by weight, based on the weight of the binder, of a such agents and additives.

To improve, for example, application properties, such as, flow or leveling, it may be necessary to add small amounts of conventional organic solvents that are commonly used in coating compositions. Typically, such solvents should be in small amounts and only increase the VOC of the coating composition to about 0.025–0.010 kg/L.

The primer composition can be applied by conventional techniques, such as, spraying, electrostatic spraying, dipping, brushing, and flow coating and baked under conventional temperature conditions, such as, baking at 140° C. to 180° C. for 15 to 45 minutes.

Typically, the primer composition is used in combination with a base coat/clear coat finish. The primer is applied and cured by baking and has a dry coating thickness from about 25 to 35 microns and then a base coating is applied over the primer and a clear coating is then applied over the base coating before the base coating is fully cured. This is a so called "wet-on-wet process", and the base coating and clear coating are then fully cured usually by baking at elevated temperatures. The base coating and clear coating preferably have a dry coating thickness ranging from 5 to 40 microns and 25 to 75 microns, respectively.

The novel primer composition may be used as a primer under a pigmented monocoat topcoat.

The following examples illustrate the invention. All parts and percentages are on a weight basis unless otherwise indicated. Molecular weights are determined by GPC (Gel Permeation Chromatography) using polymethyl methacrylate as the standard.

Testing Procedures Used in the Examples

Adhesion—DuPont test method TM-0486 B

Gravelometer—Test method SAE J400

Yellowing Test—DuPont test method TM-2011 E wherein the delta b value was measure with an X-Rite Colorimeter Model No. MA 100B and compared to a control. Positive b values indicate more yellowing than control and negative b values indicate less yellowing than control.

EXAMPLE 1

An aqueous polyester dispersion was formulated by addition of water to a solution polyester and then by the subsequent neutralization of the polyester with a hydroxy alkyl amine.

The solution polyester was formed by esterifying neopentyl glycol, trimethylol propane, 1,6 hexane diol, adipic acid, isophthalic acid and trimellitic anhydride. These materials were heated until the mixture had an acid value of 45 mg KOH/g resulting in a polymer having a number average molecular weight of 2350. A melt of this polymer was diluted with MEK (methyl ethyl ketone) to form a solution polyester having a non-volatile solids content of 70%. An aqueous polyester dispersion was formed by adding deionized water and adjusting the pH to about 6.0–7.0 with tris(hydroxymethyl)aminomethane and a vacuum was applied to remove MEK to form a dispersion having 42% non-volatile solids content and a particle size of less than 40.0 nm.

A white primer coating composition A was prepared by blending the following constituents together:

| Components | Parts by Weight |
|---|---|
| Portion 1 | |
| Colloidal silica clay water solution (3% solids) | 26.7 |
| Hydroxy functional acrylic latex (35% polymer solids having acid number of 5–20) | 107.7 |
| Portion 2 | |
| PPG-425 (polypropylene ether glycol weight average molecular weight 425) | 36.6 |
| Polyacrylate flow modifier (50% solids) | 7.4 |
| Cymel ® 303 (monomeric fully methylated melamine formaldehyde crosslinking agent) | 84.5 |
| Aliphatic urethane diols (88% solids in water of the reaction product of diamine and cyclocarbonate having a hydroxyl no. of 50–500) | 63.7 |
| Portion 3 | |
| White Pigment Dispersion (72.5% solids of a pigment dispersion of an acrylic polymer dispersant/titanium dioxide pigment/carbon black pigment in a solids ratio of 2.78/97.2/0.02) | 409.6 |
| Portion 4 | |
| Aqueous polyester dispersion (prepared above) | 347.9 |
| Acid catalyst solution (25% organic sufonic acid blocked with diisopropanol amine) | 11.9 |
| Dionized water | 11.0 |
| Total | 1107.0 |

Portion 1 was charged into a mixing vessel and mixed for 20 minutes. Portion 2 then was added with mixing and mixing was continued for 20 minutes. Portion 3 was added with mixing and mixing continued for 20 minutes. The constituents of Portion 4 were added in the order shown with mixing and then mixed an additional 30 minutes. The pH of the resulting primer composition was adjusted to a pH of 8.1–8.4 with tris (hydroxymethyl) aminomethane and the composition was diluted with deionized water to a viscosity of 35 seconds measured with a #4 Ford Cup. The composition was filtered by passing it through a 25 micron filter. The resulting composition had a theoretical solids content of 61% and a VOC (measured according to EPA Method 24) of 0.053 kg/L (0.44 pounds/gallon).

The above prepared primer composition A was applied by spraying a layer onto a phosphatized steel panel coated with a cured cathodic epoxy resin based electrodeposition primer. The primer layer was flash dried for 5 minutes and bake for 10 minutes at 82° C. (180° F.) followed by curing in an electric oven for 25 minutes at 160° C. (325° F.). The resulting primer layer had a dry film thickness of 25–35 microns (1.0–1.4 mils). Over this primer layer a base coat of a white pigmented waterborne base coating composition of an acrylic polymer crosslinked with a melamine resin was applied and flash dried for 5 minutes and baked for 10 minutes at 82° C. (180° F.). A conventional commercially-available acryosilane clear coating composition (Gen® IVAW from DuPont) was spray on top of the uncured base coat and flash dried for 10 minutes and the base coat and clear coat were cured for 30 minutes at 140° C. (285° F.). The resulting coated Panel A had primer layer of primer composition A, a base coat that had a dry film thickness of 20–30 microns (0.8–1.2 mile) and a clear coat that had dry film thickness of 43–48 microns (1.7–1.9 mils).

A white primer composition B identical to the above primer composition A was prepared except tripropylamine was used instead of tris(hydroxymethyl)aminomethane for neutralization of the polyester and for final pH adjustment. White primer composition B was used as a control. Panel B (control) was prepared using the same phosphatized steel panel coated with a cured cathodic epoxy resin based electrodeposition primer as above over which the above white primer coating composition B was applied and then the above described white pigmented waterborne base coating composition was applied to the same wet film thickness and flash dried and baked as above and then the same clear coating composition was applied, flash dried and baked as above to form Panel B (control).

The following tests were conducted on each of the above panels A and B and the results of these tests are shown in the following Table 1:

TABLE 1

| | RESULTS | |
|---|---|---|
| TEST | Panel A (invention) | Panel B (control) |
| Adhesion | good | good |
| Gravelometer | 5AB | 4AB |
| Yellowing Test Measured delta b value against Panel B | −3.1 Less Yellowing | 0.0 (STD) |

Panel A, the invention, showed an improvement in Gravelometer test results and a significant improvement in non-yellowing in comparison to the control Panel B that used the same primer except that it was neutralized with tripropylamine.

EXAMPLE 2

Primer compositions C–G were prepared by blending the following constituents together:

| Components | Parts by Weight |
|---|---|
| Colloidal silicate clay solution (3% solids) | 3.56 |
| Acrylic latex (described in Example 1) | 9.56 |
| Polyacrylate flow modifier (50% solids) | 0.45 |
| Cymel ® 301 (monomeric fully methylated melamine formaldehyde crosslinking agent) | 7.50 |
| PPG-425 (polypropylene ether glycol weight average molecular weight 425) | 3.15 |
| Aliphatic diols (described in Example 1) | 5.66 |
| Aqueous polyester dispersion (prepared in Example 1) | 30.61 |
| Acid catalyst solution (25% paratoluene sulfonic acid blocked with the corresponding amine shown in Table II below) | 0.7 |
| Amine (shown in Table II below) | — |

-continued

| Components | Parts by Weight |
|---|---|
| White pigment dispersion (described in Example 1) | 36.38 |
| Deionized water | 2.43 |
| Total | 100.00 |

Each of the primer compositions C–G were neutralized and the pH adjusted as in Example 1 with one of the following combinations of hydroxy functional alkyl amines shown in Table II. The first amine listed is used to neutralize the resin dispersion and the second is used to adjust the final pH of the primer composition within a range of 7.7 to 8.3.

TABLE II

| Panel | Amine | Delta b Value | VOC (lbs./gal) |
|---|---|---|---|
| C | AMP/AMP | 0 (STD) | 0.744 |
| D | TRIIPOA/TRIIPOA | 1.24 | 0.366 |
| E | TRIIPOA/MDEOA | 0.38 | 0.272 |
| F | TRIIPOA/DEOA | 1.02 | 0.326 |
| G | MDEOA/MDEOA | 0.61 | 0.421 |

Delta b value- positive numbers indicate more yellowing than panel C.
Abbreviations used in Table II:
AMP 2-amino-2-methyl-1-propanol
TRIIPOA triisopropanolamine
MDEOA N-methyldiethanolamine
DEOA diethanolamine Each of the above prepared primers C–G were applied to a phosphatized steel panel coated with a cathodic epoxy electrocoating composition. The panels were flash dried for 10 minutes at ambient temperature, baked for 10 minutes at 82° C. and cured for 60 minutes at 195° C. to form a primer layer about 25–32 microns thick. Each panel was tested for yellowing (delta b value) and compared to Panel C and the results are shown in Table II above.

Panel C (AMP/AMP) was used as a standard and the delta b value of Panels D–G were measured relative to this standard and showed that these panels also gave comparable low yellowing in comparison with Panel C. Combinations of TRIIPOA/DEOA, TRIIPOA/MDEOA and MDEOA/MDEOA gave acceptable yellowing results. Surprisingly, the primer compositions D-G had a significantly lower VOC in comparison to primer composition A that utilized AMP.

What is claimed is:

1. An aqueous coating composition having a VOC of less than 0.12 kg/L (1.0 pounds/gallon) comprises 25% to 70% by weight of film-forming binder and correspondingly, 75% to 30% by weight of an aqueous liquid carrier for the binder and containing pigment in a pigment to binder weight ratio of 5/100 to 150/100 and having a pH of 7–10; wherein the binder comprises
    a. 50% to 95% by weight, based on the weight of the binder, of a blend of polymers comprising a dispersed acrylic polymer, a dispersed polyester having an acid value of 15 to 60, a number average molecular weight from 1500 to 7000 and further having a hydroxyl value with the hydroxyl value being not more than 95 and a hydroxy terminated component selected from the group consisting of a polyalkylene ether polyol, a urethane diol, or a mixture of the above, and;
    b. 10% to 50% by weight, based on the weight of the binder, of a water-compatible alkylated melamine formaldehyde crosslinking agent; and
    wherein a hydroxy functional alkyl amine is used to neutralize the binder and adjust the pH of the composition.

2. The coating composition of claim 1 wherein the hydroxy functional alkyl amine is selected from the group consisting of aminomethyl propanol, aminoethyl propanol, dimethylethanolamine, N-methyldiethanolamine, diethanolamine, diglycolamine, tris(hydroxymethyl) aminomethane, aminoethylpropanediol, diisopropanolamine and triisopropanolamine.

3. The coating composition of claim 1 in which the crosslinking agent is selected from the group consisting of a monomeric hexamethoxymethylol melamine, a mixed monomeric methylated and butylated melamine and a polymeric methylated melamine.

4. The coating composition of claim 1 wherein the dispersed acrylic polymer comprises a polymer of an alkyl (meth)acrylate, hydroxy alkyl(meth)acrylate and (meth) acrylic acid.

5. The coating composition of claim 1 wherein the dispersed acrylic polymer comprises a core shell latex of a polymer of allyl methacrylate, methyl methacrylate, butyl acrylate, hydroxy ethyl acrylate and methacrylic acid.

6. The coating composition of claim 1 in which the polyol comprises a blend of a polyalkylene ether glycol having number average molecular weight of 100–2000 and a hydroxy functional urethane diol having a hydroxyl number of 50–500.

7. The coating composition of claim 6 in which the polyalkylene ether glycol is polypropylene ether glycol.

8. The coating composition of claim 1 in which the polyester comprises the esterification product of at least one polyhydric alcohol, optionally at least one monocarboxylic acid, at least one polycarboxylic acid component selected from the group consisting of dicarboxylic acids tricarboxylic acids and tricarboxylic acid anhydrides.

9. The coating composition of claim 8 wherein the polyester comprises the esterification product of neopentyl glycol, trimethylol propane, 1,6 hexane diol, adipic acid, isophthalic acid and trimellitic anhydride.

10. The coating composition of claim 1 containing 0.1 to 2.0% by weight, based on the weight of the binder, of a blocked acid catalyst.

11. The coating composition of claim 10 in which the blocked acid catalyst comprises an organic sulfonic acid blocked with a hydroxy functional alkyl amine.

12. The coating composition of claim 1 containing 0.1–5.0% by weight, based on the weight of the binder, of an additive selected from the group consisting of cellulose polymers, alkali-swellable acrylic emulsion polymers, fumed silica, synthetic chemically treated clay and any mixtures thereof.

13. The coating composition of claim 1 in which the blend of polymers consists essentially of 5–45% by weight, based on the weight of the polymer blend, of a dispersed acrylic polymer comprises a core shell latex of a polymer of allyl methacrylate, methyl methacrylate, butyl acrylate, hydroxy ethyl acrylate and methacrylic acid, 5–35% by weight, based on the weight of the polymer blend, of a blend of a polyalkylene ether glycol having number average molecular weight of 100–2000 and a hydroxy functional urethane diol having a hydroxyl number of 50–500 and 30–90% by weight, based on the weight of the polymer blend, of a polyester that comprises the esterification product of at least one polyhydric alcohol, at least one monocarboxylic acid, at least one polycarboxylic acid selected from the group consisting of dicarboxylic acids tricarboxylic acids and tricarboxylic acid anhydrides.

14. A substrate coated with the primer composition of claim 1.

15. A substrate having a multi-layer coating comprising a pigmented primer coating of the composition of claim 1, a base coating comprising a pigmented coating composition, and a clear top-coating.

* * * * *